US012561836B1

(12) United States Patent
Sudhir Singh et al.

(10) Patent No.: US 12,561,836 B1
(45) Date of Patent: Feb. 24, 2026

(54) SYSTEM AND METHODS FOR SURFER POSE ESTIMATION

(71) Applicant: Brunswick Corporation, Mettawa, IL (US)

(72) Inventors: Rakshith Sudhir Singh, Peoria, IL (US); Jason S. Arbuckle, Horicon, WI (US)

(73) Assignee: Brunswick Corporation, Mettawa, IL (US)

( * ) Notice: Subject to any disclaimer, the term of this patent is extended or adjusted under 35 U.S.C. 154(b) by 238 days.

(21) Appl. No.: 18/312,065

(22) Filed: May 4, 2023

(51) Int. Cl.
 *G06T 7/73* (2017.01)
 *A63B 69/00* (2006.01)
 *G06T 7/194* (2017.01)

(52) U.S. Cl.
 CPC ............ *G06T 7/74* (2017.01); *A63B 69/0093* (2013.01); *G06T 7/194* (2017.01)

(58) Field of Classification Search
 CPC ......... G06T 7/74; G06T 7/194; G06T 19/006; A63B 69/0093; A63B 71/0622; A63B 24/0006; A63B 2024/0015; A63B 2071/0647; A63B 2220/807; A63B 2071/0658; A63B 2220/10; A63B 2220/806; G09B 19/0038; G05D 3/12
 See application file for complete search history.

(56) References Cited

U.S. PATENT DOCUMENTS 6,138,601 A 10/2000 Anderson et al.
8,539,897 B1 9/2013 Gasper et al.

8,833,286 B1 9/2014 Sheedy et al.
9,315,235 B1 4/2016 Wood
9,540,074 B1 1/2017 Pigeon
9,796,451 B2 10/2017 Brendel
9,937,984 B2 4/2018 Herrington et al.
10,040,522 B1 8/2018 Hartman et al.
10,479,461 B1 11/2019 Hartman et al.
10,683,061 B2 6/2020 Gasper et al.
10,858,080 B1 12/2020 Hartman et al.
11,067,979 B2 7/2021 Green et al.
11,260,946 B1 3/2022 Przybyl et al.

(Continued)

OTHER PUBLICATIONS

Zöllner, Michael, et al. "Evaluation of Machine Learning based Pose Estimation of Surfers on River Waves." Proceedings of the 16th ACM International Conference on PErvasive Technologies Related to Assistive Environments, PETRA 2023. 443-447 (Year: 2023).*

*Primary Examiner* — Abhishek Sarma
(74) *Attorney, Agent, or Firm* — Andrus Intellectual Property Law, LLP

(57) ABSTRACT

A wake surf monitoring system includes an image system configured to image an area behind an marine vessel that includes at least one image sensor and a control system configured to receive image data from the image system containing at least one image of the area behind the marine vessel. The control system is further configured to identify a wake surfer in the at least one image and determine surfer pose data of the wake surfer, compare the surfer pose data to ideal pose information to identify a pose difference, and generate pose feedback based on the pose difference. The system may also include at least one display controllable by the control system to display the pose feedback to a user.

23 Claims, 9 Drawing Sheets

(56)         References Cited

U.S. PATENT DOCUMENTS

| | | | |
|---|---|---|---|
| 2014/0031703 A1* | 1/2014 | Rayner | A61B 5/1118 |
| | | | 600/484 |
| 2016/0199693 A1* | 7/2016 | Vermilyea | A63F 13/211 |
| | | | 700/91 |
| 2017/0021257 A1* | 1/2017 | Olsen, II | G09B 19/06 |
| 2019/0126118 A1* | 5/2019 | Lestrade | B63B 32/70 |
| 2019/0325218 A1* | 10/2019 | Freeston | G06V 20/182 |
| 2022/0054925 A1* | 2/2022 | Chiang | A63B 71/0622 |

* cited by examiner

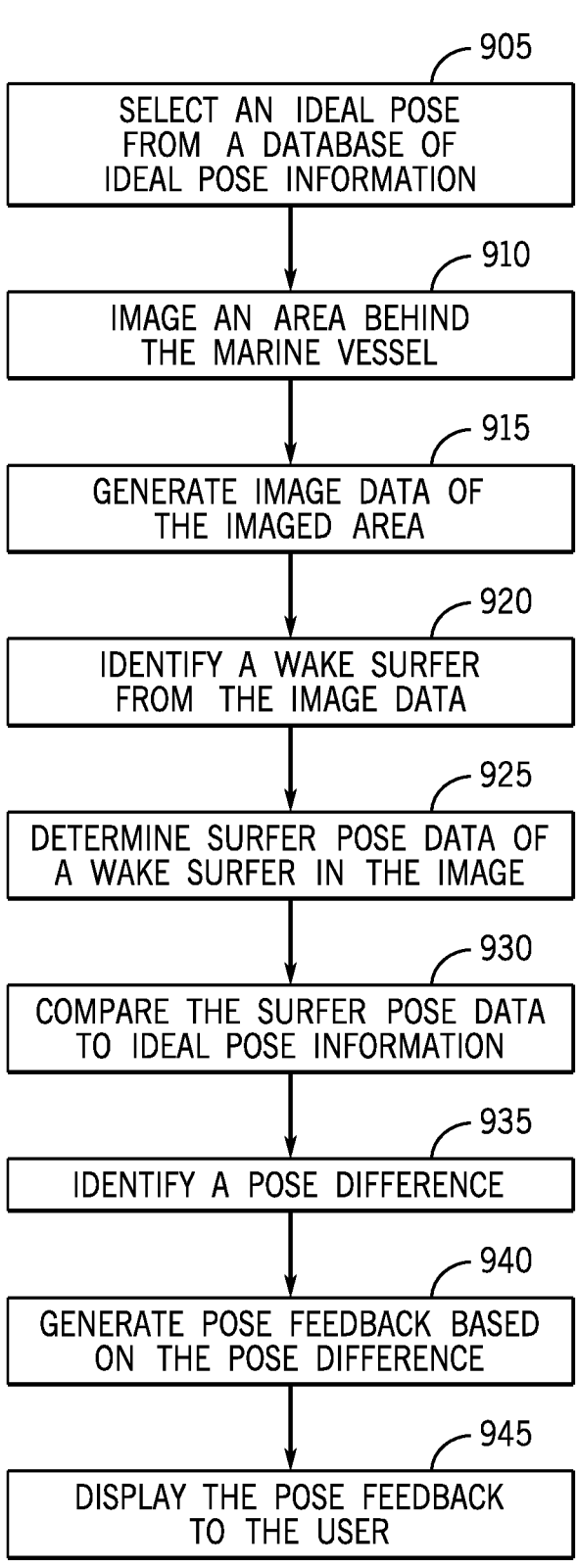

SELECT AN IDEAL POSE
FROM A DATABASE OF
IDEAL POSE INFORMATION
905

IMAGE AN AREA BEHIND
THE MARINE VESSEL
910

GENERATE IMAGE DATA OF
THE IMAGED AREA
915

IDENTIFY A WAKE SURFER
FROM THE IMAGE DATA
920

DETERMINE SURFER POSE DATA OF
A WAKE SURFER IN THE IMAGE
925

COMPARE THE SURFER POSE DATA
TO IDEAL POSE INFORMATION
930

IDENTIFY A POSE DIFFERENCE
935

GENERATE POSE FEEDBACK BASED
ON THE POSE DIFFERENCE
940

DISPLAY THE POSE FEEDBACK
TO THE USER
945

FIG. 9

SYSTEM AND METHODS FOR SURFER POSE ESTIMATION

FIELD

The present disclosure relates to marine vessels, and more particularly to systems and methods for managing wake surfing, including providing instructional feedback to wake surfers.

BACKGROUND

The following U.S. Patents and Patent Application Publications are incorporated herein by reference, in entirety:

U.S. Pat. No. 9,937,984 discloses a wake control system aft of the driveshaft, propeller, and rudder of a vessel that includes a fin base and at least one fin slidingly engaged with the fin base. The fin(s) are vertically oriented and extend down into the water surface. The fins are transversely adjustable along the fin base to redirect a wake generated by the boat. In other embodiments, the control system comprises a starboard fin tab adjacent to a port fin tab, each of the independent fin tabs hingeably attached to the aft section of the hull, at the transom. Each fin tab includes at least one extending fin. Fin tabs are selectively deployable and retractable into and out of the water surface to redirect a wake generated by the vessel from one side to the other. A novel underwater exhaust system redirects exhaust depending on speed of the vessel and complements the wake control system.

U.S. Pat. No. 11,260,946 discloses a method of automatically controlling trim position of a marine drive with a control system on a marine vessel that includes receiving a user-selected command associated with wake surfing and then controlling a trim actuator to automatically position the marine drive in a tucked position, tucked position is between a vertical trim position and a minimum running trim position. Once a vessel condition of the marine vessel reaches a first threshold vessel condition the trim actuator is controlled to trim up the marine drive to a predetermined target trim position to generate wave behind the marine vessel. The first threshold vessel condition is at least one of a threshold vessel speed, a threshold engine speed, a threshold engine load, and a threshold vessel pitch.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a wake surf monitoring system includes a memory storing a database of ideal pose information, an image system, a display device for a pose feedback display, and a control system. The control system is configured to determine the pose difference between a surfer pose estimate and an ideal pose. A pose feedback display is then generated representing improvements to the wake surfer's surfer pose estimate to become more similar to the ideal pose.

In another embodiment, a wake surf monitoring system includes an image system configured to image an area behind a marine vessel that includes at least one image sensor and a control system configured to receive image data from the image system containing at least one image of the area behind the marine vessel. The control system is further configured to identify a wake surfer in the at least one image and determine surfer pose data of the wake surfer in the image, compare the surfer pose data to ideal pose information to identify a pose difference, and generate pose feedback based on the pose difference. The system may also include at least one display controllable by the control system to display the pose feedback to a user.

In another embodiment, the system allows for the selection of ideal pose information from a database of ideal pose information.

In another embodiment, the system is configured such that the wake surfer can input a skill level and the pose feedback will be generated accordingly.

In one embodiment, a method of monitoring wake surfing includes imaging an area behind a marine vessel with an image system to generate image data and processing the image data with a controller to determine surfer pose data of a wake surfer in the image. The surfer pose data is then compared to ideal pose information to identify a pose difference and pose feedback is generated based on the pose difference, which gets displayed.

In another embodiment, the method includes determining a surfer pose estimate for each of a predetermined number of images per second for which a surfer is identified to determine the surfer pose data.

In another embodiment, the method includes generating a fall alert if less than a threshold number of surfer pose estimates are identified in a predetermined period.

Various other features, objects, and advantages of the invention will be made apparent from the following description taken together with the drawings.

BRIEF DESCRIPTION OF THE DRAWINGS

The accompanying drawings that are incorporated in and constitute a part of this specification illustrate several embodiments of the disclosure and, together with the description, serve to explain the principles of the disclosure. The present disclosure is described with reference to the following figures.

FIGS. 7, 8, and 9 depict exemplary methods for monitoring wake surfing according to embodiments of the present disclosure.

DETAILED DESCRIPTION

The present disclosure relates to marine vessels equipped for wake surfing and having control systems and devices for capturing and displaying pose feedback for a surfer pose estimation, such as to improve a surfing experience for a rider behind the marine vessel. The inventors have recognized that wake surfing is a difficult activity to learn and to perfect, and that the surfing experience is negatively impacted when the rider struggles to learn and master the sport. Without constructive feedback and a way to review past performance, improvement is slow and difficult.

In view of those challenges, the inventors developed the disclosed system to provide assistance and/or pose feedback to help a wake surf rider learn quickly from their mistakes and master the form of seasoned professionals. As disclosed herein, a wake surf monitoring system is configured to image an area behind the vessel, generate image data of the imaged area, determine the surfer pose data of the wake surfer in the image, compare the surfer pose data to the ideal pose information, identify a pose difference between the surfer pose estimate and the ideal pose information, generate pose feedback based on the pose difference, and display the pose feedback to the user.

In some embodiments, pose feedback includes selecting ideal pose information from a database of ideal pose information. Alternatively or additionally, the wake surf monitoring system includes controlling at least one of a group of wave generation accessories, such as one or tabs, plates, wedges, or other elements mounted to the lower portion of the transom or on the rear side of the vessel, a ballast, or other device to increase or decrease a pitch of the marine vessel and control the size and shape of the wake wave. Many different types of wave shaping accessories are known in the art. For instance, the wave generation accessories may include one or more wave-shaping plates, such as trim tab(s), wakeplate(s), surf gate(s), or other element(s) controllable to change the wave shape, size, and/or location behind the vessel. Alternatively or additionally, the wave generation accessories may include one or more ballasts, where a fill level of the ballast is controllable.

Figure 1:
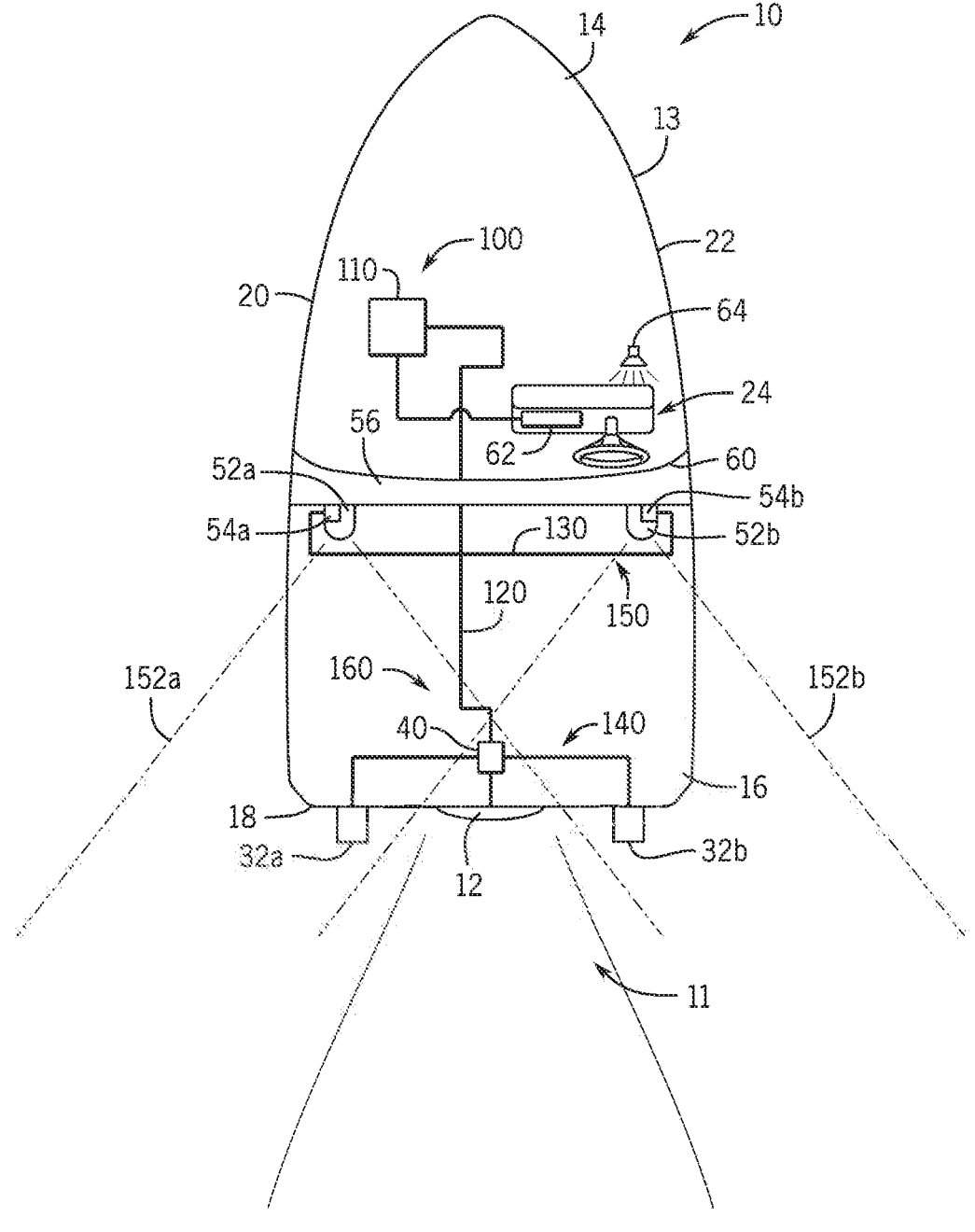
FIG. 1 is a schematic view of a marine vessel having an exemplary wake surf monitoring system according to one embodiment of the present disclosure.

FIG. 1 depicts a marine vessel 10 having a hull 13 that extends in a longitudinal direction between a bow 14 and a stern 16 with a transom 18 located at the stern 16. The hull 13 further extends between a port side 20 and a starboard side 22 in a lateral direction. A helm 25 is positioned laterally between the port and the starboard sides 20, 22 and longitudinally between the bow 14 and stern 16. The marine vessel 10 includes a control system 100 comprising one or a plurality of communicatively connected controllers, such as communicating on a CAN bus 120, an image system, a propulsion system 140. The control system 100 includes one or more controllers 110 (such as a helm control unit and/or a propulsion control unit, or any other control module). The control arrangement shown in FIG. 1 and explained herein is merely exemplary and a person of ordinary skill in the art will understand in view of the present disclosure that other arrangements of communicatively connected control units and distribution of control functionality are within the scope of the present disclosure. A multitude of various control arrangements for the marine drive(s), or propulsion device(s), and wave generation accessories on a marine vessel, and for coordination of sensors and auxiliary devices with the function of the marine drive(s), are well known in the art. The embodiments of marine vessels, marine drives, and control arrangements therefor are shown and described herein for purposes of exemplifying the systems and methods disclosed herein and should not be considered limiting.

The propulsion system 140 includes at least one marine drive 12 which is controlled via a powertrain computer 40 which, in the depicted arrangement, communicates with a central controller 110 via the CAN bus 120. The marine drive 12 is configured to generate thrust to propel the marine vessel 10 through water in a conventional manner, thus producing a wake. The marine drive 12 has a powerhead (e.g., an electric motor, an internal combustion engine, or a hybrid thereof) coupled in torque-transmitting relationship with a propeller to propel the marine vessel 10 in a manner known in the art. The marine drive 12 is presently shown as an inboard motor, but could alternatively be an outboard drive, a stern drive, a pod drive, a jet drive, and/or the like. In some embodiments, a trim angle of the marine drive 12 is adjustable in a manner known in the art, specifically by control of trim actuators (not shown) (which may be electric, hydraulic, and/or pneumatic). In the depicted embodiment, trim actuators of the marine drive 12 are controlled via the powertrain computer 40 which communicates with the controller 110 via the CAN bus 120. In one embodiment, the trim actuators may respond to images of the wake wave, as collected by the image system 150.

The image system 150 is configured to image an area behind the marine vessel 10 to capture the wake wave and a rider thereon. As exemplified in the embodiment shown in FIG. 1, the image system 150 includes one or more image sensors cameras pointed toward the rear of the vessel, which may be communicatively connected to one or more image computers via a dedicated bus 130. The image system 150, which in one embodiment is a stereovision system, may use a configuration of multiple image sensors 52a, 52b with one or more corresponding image computer(s) 54a, 54b.

In one embodiment, the field of view is focused on the location of the wake wave 66 in a fixed position. The fixed position can be a result of a fixed camera and a fixed lens, as an example. This means that the field of view remains the same regardless of the position of the wake surfer 170. The wake waves 66 do not exceed the limits of the field of view, allowing for detection of the wake surfer 170 and/or the wake wave 66.

In one embodiment of a stereovision configuration, at least one image computer 54 is configured to process image data captured by two image sensors 52a, 52b positioned at a known distance from one another and derive measurements of wave geometry based on differences/disparity in pixel location between images simultaneously captured by the image sensors 52a, 52b. Wave measurements may include wave height, width, slope, wave surface curvature, and the like. Wave features may be identified based on the measured wave geometry, such as the wave peak, curl, and boundaries of the wave pocket. Each of the image sensors 52a, 52b has a field of view 152a, 152b, wherein the fields of view 152a, 152b overlap in at least a portion of an area 11 behind the marine vessel 10. The processed image data is communicated to the controller 110 via the image bus 130. The image sensors 52a, 52b are positioned to capture image data of the area 11 behind the marine vessel 10. In the illustrated embodiment, the sensors 52a, 52b are positioned on laterally opposing ends of a tower 56 extending over the helm 25. The sensors 52a, 52 may also be positioned on alternative raised features, such as a center console, a Bimini top, or the like which allow for lateral spacing between the first and second image sensors 52a, 52b.

The wave control system 160 includes the propulsion system 140, the image system 150, and at least one wave generation accessory, such as such as tabs, plates, wedges, or other elements mounted to the lower portion of the transom or on the rear side of the vessel, a ballast, or other device to increase or decrease a pitch of the marine vessel and control the size and shape of the wake wave. The wave generation accessory may be a trimmable device 32 which is movable and is controlled via the controller 110. In some embodiments, the marine drive 12 constitutes the at least one trimmable device 32. Examples of trimmable devices 32 include surf trim tabs, movable or retractable surf gates, one or more wakeplates, or other wave-shaping plates or elements, and/or the like. In the example in FIG. 1, the at least one trimmable device 32 is a first and second surf tab 32a, 32b, as it will be referred to herein. The surf tabs 32a and 32b are configured to adjust the displacement of the water behind the vessel to shape and/or locate the wave. The first and second surf tab 32a, 32b are positioned on opposing ends of the stern 16 and extend longitudinally rearwardly from the transom 18. The surf tab 32a, 32b are adjustable via tab actuators (not shown) which may be electric, pneumatic, and/or hydraulically actuated in a manner known in the art.

The helm 25 of the marine vessel 10 includes an input device 60, which is shown as a steering wheel but could also or alternatively include a joy stick, track pad, throttle lever, and/or any other user input device available in the art for providing throttle or steering input to control the marine vessel 10. A user interface includes a display 62 is also provided at the helm 25, which may include any digital or other display that provides a visual depiction of information relating to the marine vessel 10, such as vessel speed, engine status, fuel levels, direction, pitch, ballast levels, trim angles, wake modification alerts, etc. For example, the controller 110 may track and/or control the multitude of subsystems on the marine vessel 10 and may control the user interface to convey information pertaining to the marine vessel 10 and/or its subsystems. To provide one example, the display 62 may be a VesselView display by Mercury Marine Corporation of Fond du Lac, Wisconsin. The user interface may also include a speaker 64 for providing audible output to a user, such as to be audible by a person standing at the helm 25.

Figure 2:
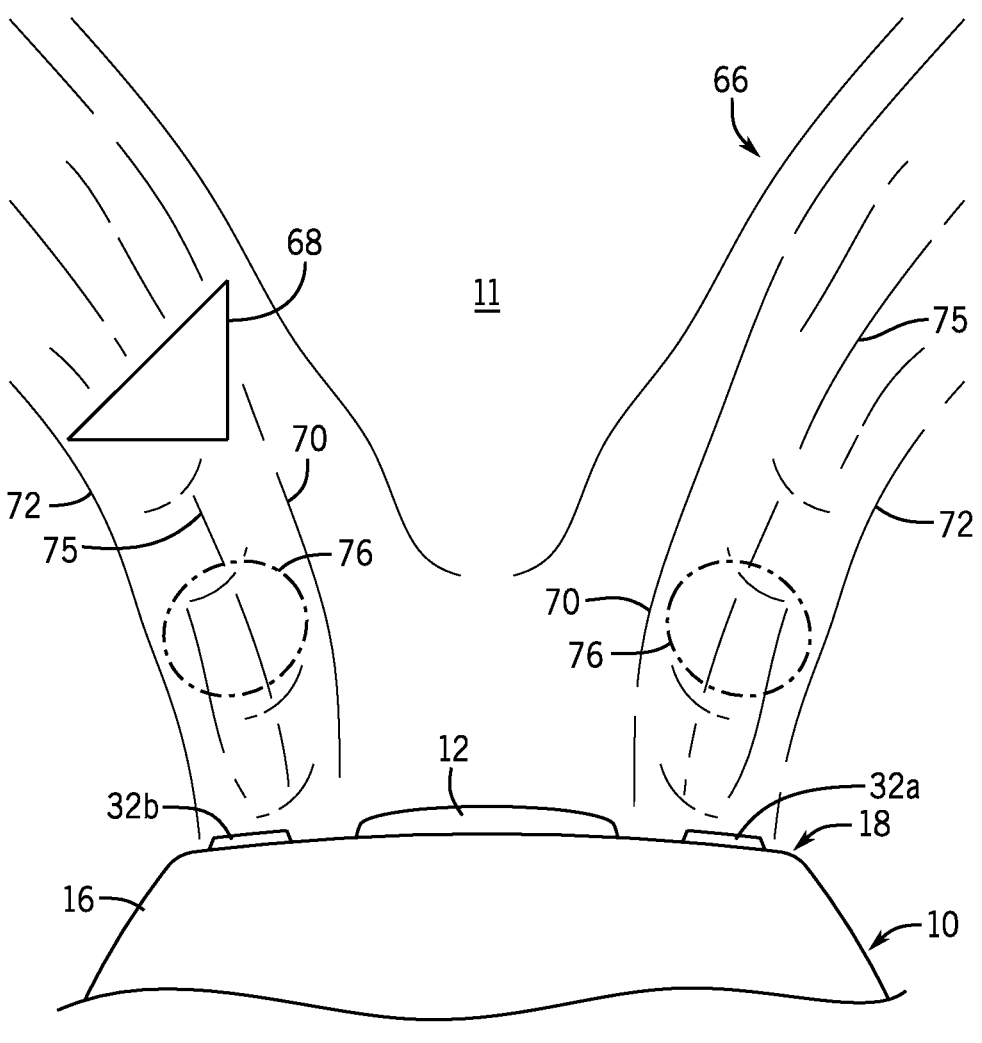
FIG. 2 exemplifies an image captured by an image system according to one embodiment of the present disclosure.

FIG. 2 shows a perspective view of the area 11 behind the marine vessel 10 which is to be captured in the image data via the image sensors 52a, 52b. A wake wave 66 is produced by the marine drive 12 and extends laterally outward and longitudinally rearward from the stern 16. The wake 66 has a wave height 68, which may be defined by the vertical displacement of two diverging crest lines 70 from two diverging trough lines 72. Spaced vertically between the crest lines 70 and trough lines 72 are inflection lines 75, wherein the wake wave 66 breaks upon itself creating a tunnel-like form, sometimes called the "curl". A wave pocket 76 is an area of the wave where the wake rider 90 should be positioned to achieve optimal forward thrust from the wake wave 66. The wave pocket 76 is located adjacent to and outside of the inflection lines 75, and in some embodiments may be determined to be at a location where the wave height is the greatest.

An optimal surf location range is defined as a range of locations with upper and lower bounds in the lateral, the longitudinal, and the vertical direction defining the wave pocket 76. Typically, it is desirable to maintain the pocket 76 within a threshold distance range from the transom 18, which will vary based on the speed, the pitch, and the drag coefficient of the marine vessel 10. In addition to vessel speed, the location of the wave or wave pocket 76 can also be affected by various controllable factors, such as the positioning of surf tabs, wakeplate or other wave-shaping element, the trim of marine drives, the fill level of a ballast tank(s), or the like. Upon observation of the wake surfer 170 in relation to the wave pocket 76, these controllable factors may be manipulated to align the wake surfer 170 with the wave pocket 76, thereby improving the learning experience. The speed and pitch of the vessel may be measured by sensor systems and provided to the control system, and the drag coefficient of the marine vessel 10 may be stored within the controller 110, including drag coefficient values based on parameters such as tab or plate position, fill level of a ballast tank, etc.

Figure 3:
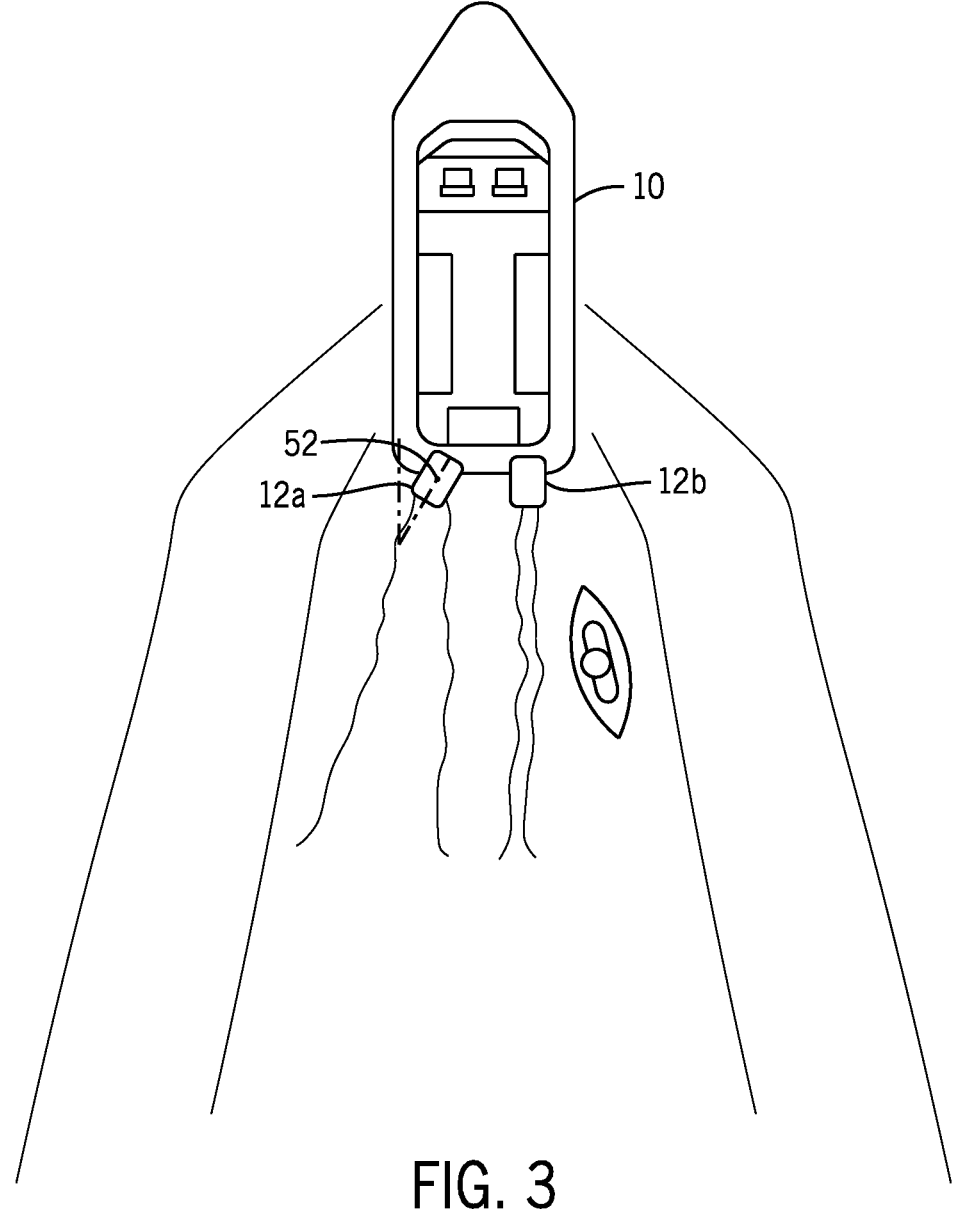
FIG. 3 is a schematic representation of a surfable area image in accordance with the present disclosure.

As illustrated by FIG. 3, to create a wave on the starboard side of a boat the port marine drive 12b would generate a yaw moment and the port trim tab would generate a roll moment. The net effect generates a delta between the heading of the marine vessel 10 and the course direction. This creates an asymmetry in the way that the water converges behind the marine vessel 10. The asymmetry then carries all of the prop wash from the port marine drive 12b over the centerline thereby creating a surfable wave on the port side of the boat. The generation of the surfable wave is dependent upon the fixed angle of the steerable device on the side of the marine vessel 10 opposite of where the surfable wave is generated. When applicable, the deployed trim tab is located on the same side of the marine vessel 10 as the steerable device with the fixed angle. This configuration contributes to a starboard side yaw moment and leaves the remaining steerable device, on the starboard side of the marine vessel 10, to maintain the proper heading and thrust levels of the marine vessel 10.

In situations with more than one marine drive 12a, 12b, the trim of each marine drive 12a, 12b may be adjusted to improve the quality of the surfable wave. In another embodiment, one active steerable device 5, such as a steerable marine drive 12, may control the heading and direction of the marine vessel while a passive component, such as a steerable rudder 61, remains at a fixed angle and generates the surfable wave.

Figure 4:
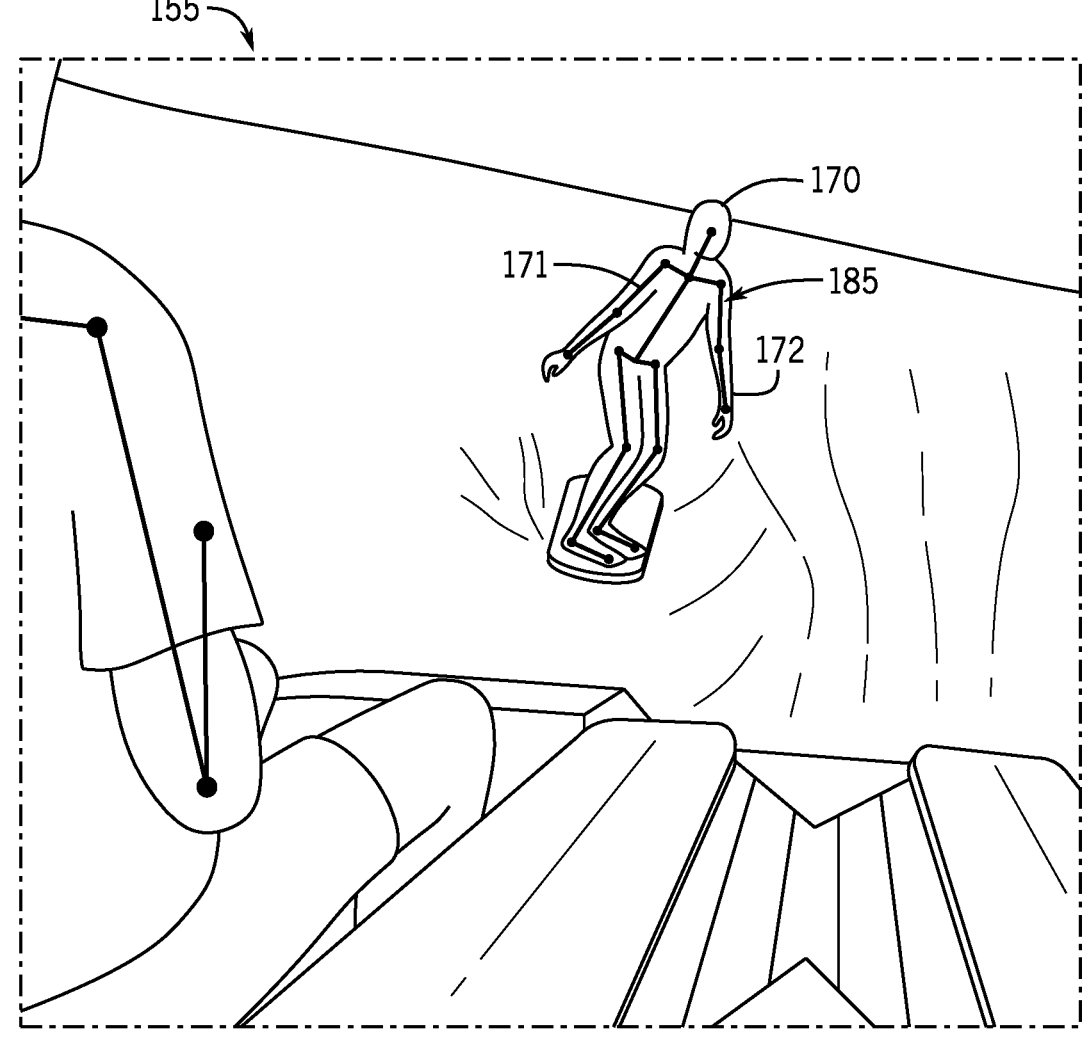
FIG. 4 depicts an embodiment of an image of a wake surfer in accordance with the present disclosure.

FIG. 4 depicts an image 155 captured by the image system 150 of a wake surfer 170 behind the marine vessel 10. The image system 150 may image an area behind the marine vessel 10 when creating the image 155. In one embodiment, the image sensors 52a, 52b are mounted on the back or facing backwards behind the marine vessel 10 and focused on the wake surfer 170. In an alternative embodiment, the field of view 152a, 152b may focus on the wake wave 66 and remain in that fixed orientation regardless of the position of the wake surfer 170.

The wake surf monitoring system may utilize the control system 100 to identify the location of the wake surfer 170 within the image 155. In one embodiment, the location of the wake surfer 170 in the image may provide an expedited means of determining the location of the wake surfer 170 in relation to the wake wave 66 and/or wave pocket 76. This determination may be expedited by the recognition of both the wake surfer 170 and the wave pocket 76 as separate objects, wherein the distance between the two objects is measured. If the wake surfer is within a range of predetermined distance from the wave pocket 76 and/or wake wave 66, the control system 100 may determine that the wake surfer 170 is in the optimal location of the wave pocket 76. Likewise, the control system 100 may reach this same determination by relative positioning of the objects, such as that the wake surfer 170 is above or on top of the wave pocket 76 and/or wake wave 66, as a non-limiting example. Similarly, the image system 150 may provide distance information regarding the wake surfer 170 in relation to the marine vessel 10. The rider distance, or the distance between the wake surfer 170 and the marine vessel 10, may be determined by the control system 100. In one embodiment, the control system 100 may select the ideal pose information based on the rider distance and/or generate the pose feedback 200 based on the rider distance. For example, the wake surfer 170 may attempt a trick that requires a closer proximity to the marine vessel 10 for a portion of the trick and the ideal pose information may include this variation and, consequently, omit pose feedback 200 that directs the wake surfer 170 to distance themselves from the marine vessel 10. Alternatively, the control system 100 may compare the rider distance to an optimal distance range related to the ideal pose information and generate pose feedback 200 further based on this comparison.

The position of the wake surfer 170 within the image 155 may indicate surfer pose data as determined by the control system 100. Surfer pose data is information related to the pose of the wake surfer 170 as observed by the image system 150. This information may include numerical values approximating the wake surfer's pose, referred to as a surfer pose estimate 185. The surfer pose data may also store the location of body parts 171, 172 and/or relative locations thereof. Similar to the ideal pose information exemplified and discussed with respect to FIG. 6, the location of the body parts 171, 172 may be stored as vectors in a matrix that includes the position of two or more body parts. Interrelated relative body part positions, such as the relative body part location of two or more body parts may be stored, including angles between body parts 171, 172 may be calculated and stored within the surfer pose data.

The control system 100 generates a surfer pose estimate 185, whereby the position of a plurality of the wake surfer's 170 body parts 171, 172 are identified. The control system 100 compares the surfer pose data to ideal pose information to identify a pose difference. Based on the pose difference, which may be defined as the difference between the surfer pose data and the ideal pose information, the wake surf monitoring system may generate pose feedback based on the pose difference and display the pose feedback to a user.

The pose feedback may inform the wake surfer 170 of changes that could be made to the wake surfer's current pose in order to improve the pose, or to better match the ideal pose information. For example, the wake surf monitoring system may inform the wake surfer 170 if they're bending their knee too much, overextending their back, or not standing straight (in proper alignment relative to the marine vessel 10.

In one embodiment, to provide pose feedback, the wake surf monitoring system may use the image system 150 to observe the wake surfer 170 for a predetermined period of time, such as two weeks, four weeks, or six weeks, as non-limiting options. Using this observed surfer pose data, the control system generates a surfer pose estimate 185 to compare against ideal pose information. For example, an ideal pose estimate 191 for the user may be generated based on the ideal pose information. The ideal pose estimate 191 is an approximation based on information determined by common positions identified in the ideal position information such as ideal positions and angles for the arms, legs, torso, head, and feet of the wake surfer 170, as a non-limiting list of examples. The ideal pose estimate 191 may aggregate and approximate these positions and angles according to the needs of the wake surfer 170. The ideal pose estimate 191 may differ in relation to the requirements of the wake surfer 170. If the wake surfer is learning the basics of wake surfing, the positions, angles, and tolerance for error may be more moderate. As the wake surfer progresses, the ideal pose estimate 191 may react accordingly, by increasing the difficulty of the ideal pose estimate 191 to further increase the skill of the wake surfer 170. In one embodiment, the pose feedback 200 and the wake surfer's 170 ability to perform accordingly may inform the pace at which the ideal pose estimate 191 increases in difficulty.

Figure 5:
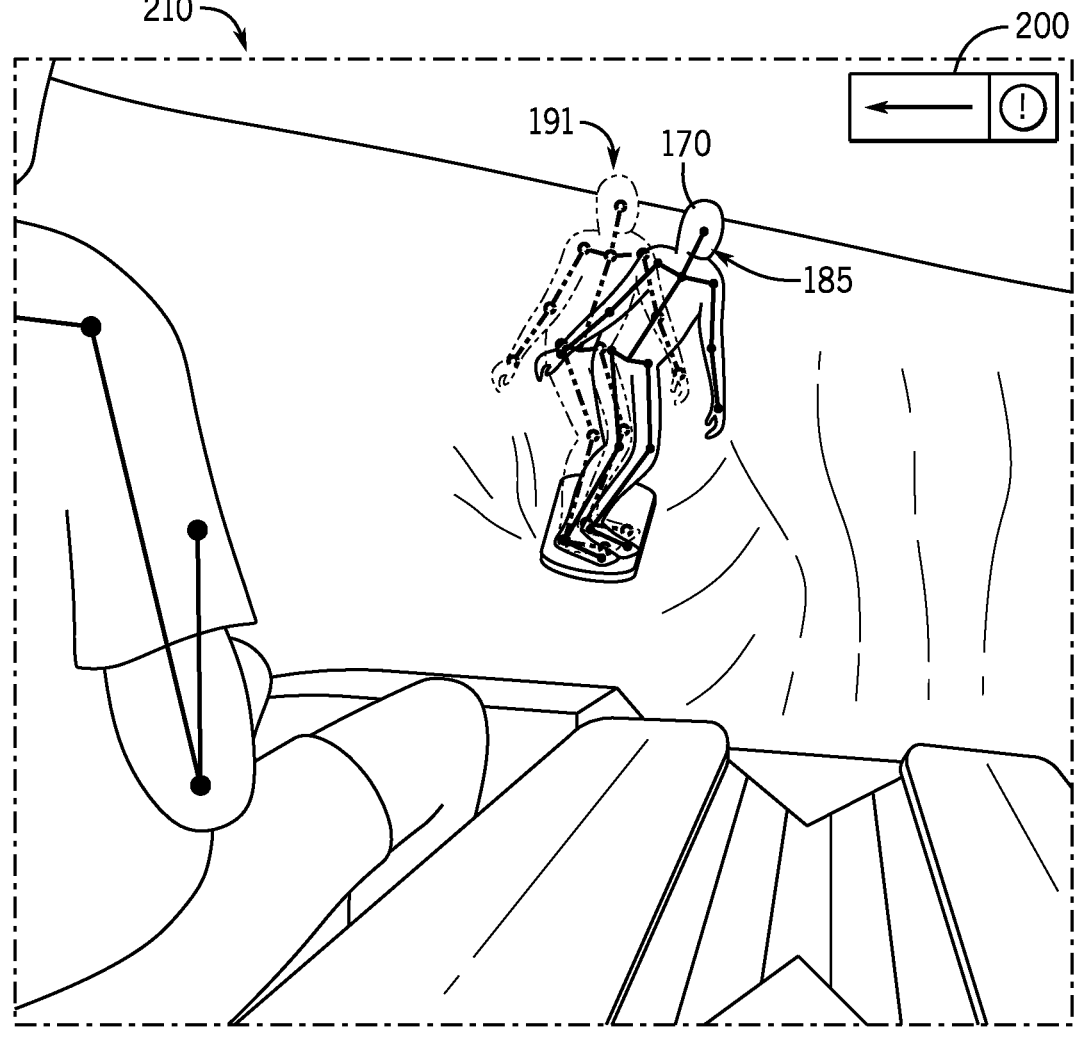
FIG. 5 depicts an embodiment of pose feedback display, in accordance with the present disclosure.

Through the comparison, the wake surf monitoring system calculates the pose difference that identifies weak spots in the current surfer pose estimate 185 that can be improved and provides pose feedback 200 to the user. Pose feedback, as used herein, refers to instruction on how to modify the surfer's pose estimate 185 to better match the ideal pose estimate 185. The pose feedback 200 may be represented through visual and/or audio signals transmitted to the wake surfer 170 via the pose feedback display 210. In another embodiment, pose feedback 200 may be directed to one or more specific body parts 171, 172. For example, the pose difference between the surfer pose estimate 185 and the ideal pose estimate 191 may provide an understanding of where an arm or leg should be positioned at a given point in time. Other feedback may include angular adjustments to achieve an ideal relative body part angle 197, such as to correct legs being too bent or a back being too hunched. As depicted in FIG. 5, the pose feedback 200 may either by presented to the participant in real-time, as the participant is wake surfing, or after the participant has finished wake surfing and is reviewing their comparative performance on a pose feedback display 210.

In order to provide pose feedback 200, the wake surf monitoring system must generate an ideal pose estimate 191 according to input provided by the wake surfer 170. In one embodiment, the ideal pose estimate 191 is created by a database of ideal pose information stored in memory accessible by the control system 100. The control system 100 is configured to select the ideal pose information for the comparison from the database of ideal pose information.

Ideal pose information, as used herein, refers to the positions of a professional wake surfer when wake surfing. The database of ideal pose information may be compiled from publicly accessible images and videos of professional wake surfers that, when analyzed and indexed by the control system 100, indicate consistent patterns in body position while wake surfing. These consistent patterns may include common positions for the arms, legs, torso, head, and feet of the wake surfer 170, as a non-limiting list of examples. In one embodiment, the ideal pose information includes the relative body part location of two or more body parts 171, 172. In another embodiment, the ideal pose information includes an ideal body part angle of at least one body part of the wake surfer 170. This ideal body part angle may be compared to another object identified within the image data, such as the board. In some situations, adjustments provided by the pose feedback 200 may improve stability as the adjustment of two or more body parts 171, 172 in relation to one another affects the balance the wake surfer 170 has while wake surfing. Utilizing the relative body part location of one or more body parts 171, 172 may be necessary to effectuate the proper pose correction. For example, the wake surfer 170 may need to straighten the front leg while also bending the rear leg to adjust the wake surfer's stance. In situations where adjustments involve rotating a body part 171, 172 at a joint, they are movements that are radial in nature. Examples of this may include bending or straightening a body part 171, 172. These types of radial movements may be measured and analyzed by a body part angle 177. The ideal pose information may include any combination of body part angles 197, relative body part locations, and/or body part 171, 172 locations, as a non-limiting list.

The ideal pose information may be stored within the database of ideal pose information in a vectorized form. In this vectorized form, the ideal pose information is initially collected as a series of points along the form of the ideal pose. The values between these points then determine the positions of body parts 171, 172 in the ideal pose information. These points and their interrelated values (the values between the points) are compared against a threshold standard. If the value of these points is very close to this threshold standard, then the collected points may be classified as appropriate ideal pose information. In one embodiment, the formulation of the threshold standard may originate from an aggregated analysis of images and videos classified as professional wake surfers.

The mathematical values of the positions of different body parts 171, 172 inform the ideal pose estimate 191 to indicate the ideal positions of the wake surfer 175 such as what angle the anterior knee should be bent at, or how close the arms should be kept to the body, as non-limiting examples. In one embodiment, the ideal pose information may, through the numerical averages of ideal vectorized positions, create a ideal criterion whereby adherence to the ideal pose estimate is assessed. Likewise, the comparison of points captured by the image system 150 that indicate the surfer pose estimate may be compared in the same numerical fashion to assess the accuracy of the surfer pose estimate in relation to the ideal pose estimate. In one aspect, the ideal criteria may use relative body part location to assess the performance of the wake surfer 170 and provide pose feedback 200, such as the relative position of the anterior hip to the anterior ankle, or the relative arm position to the posterior hip. The pose feedback 200 may correlate with the pose difference between positional points of the surfer pose estimate and the ideal pose estimate.

In another embodiment, the pose feedback 200 may correlate with previous comparisons of the surfer pose estimate 185 rather than new comparisons with the ideal pose estimate 191. While still using ideal pose information to formulate an ideal pose estimate 191, having pose feedback 200 focused more on the wake surfer's 170 previous attempts may allow for more responsive and gradual improvement, as opposed to potentially similar pose feedback being reiterated without much additional insight.

In another embodiment, the pose feedback 200 may operate in a recursive closed loop. Without an aggregation of outside sources to formulate an ideal pose estimate 191, the wake surf monitoring system may use the same prolonged recording method mentioned previously to store a plurality of instances of wake surfing by the wake surfer 170. Using these stored recordings as a similar reference as the previously described professional wake surfer images and video, the control system may derive patterns in the performance of the wake surfer to generate an ideal pose estimate 191. There may be an alternative indicator within the wake surf monitoring system to indicate data from the wake surfer that can qualify as ideal pose information. For example, the wake surf monitoring system may associate time with ideal performance and use positional points from images of the longest successful wake surfing runs to form the ideal pose information. Pose feedback 200 would then be focused on guiding the wake surfer 170 towards the positioning common with the longest times successfully wake surfing without falling. Ideally, as the wake surfer improved, the amount of time without falling would also increase, thereby improving the ideal pose information with new 'longest' runs without falling and iteratively guiding the wake surfer 170 towards gradual improvement.

Alternatively, the wake surfer 170 may use prior pose feedback to review previous videos or im ages manually. This could be in a single session, or based on a surfer profile wherein the pose feedback is saved with respect to a surfer ID.

In one embodiment, the pose feedback 200 can provide direction in reference to objects external to the wake surfer 170. As explained in FIGS. 1 and 2, the image system 150 can detect the wave pocket 76 and, upon determination of the position of the wake surfer 170 in relation to the wave pocket 76, provide pose feedback 200 that directs the wake surfer 170 into the wave pocket 76. Pose feedback 200 might include insights regarding how well or long the wake surfer 170 remained in the wave pocket 76 or what the wake surfer 170 might do to stay in the wave pocket 76 longer. Likewise, through the same method of observation used to detect the wave pocket 76, the height and shape of the wave may also be observed. In order to create a more surfable wave, the control system 100 may extend surf tab 32a, 32b to improve the wave 66 for the wake surfer 170.

In another embodiment, the pose feedback 200 provides direction on adjustments the wake surfer 170 can make relative to the board they are riding on. The board may be identifiable to the image system through unique coloration, optical pairing, or reflective paint, as non-limiting examples. Alternatively, the board may interface with the control system through an external device such as LIDAR, paired wireless transmission, an inertial measurement unit (IMU), GPS, or other transponder, as a non-limiting list of examples.

Board detect and measurement may allow the wake surf monitoring system to provide feedback on the wake surfer's 170 alignment with the board, foot placement on the board, and/or rotation in relation to the board. Similar to the measurements previously discussed, this pose feedback 200 may be measured in terms of a body part angle of at least one body part 171 of the wake surfer 170 compared to another object, such the angle of the torso in relation to the board or the alignment of the hips relative to the board. In one embodiment, the ideal pose information and/or the surfer pose data 180 may include the body part angle 177 of at least one body part 171 of the wake surfer 170 compared to another object.

Figure 6:
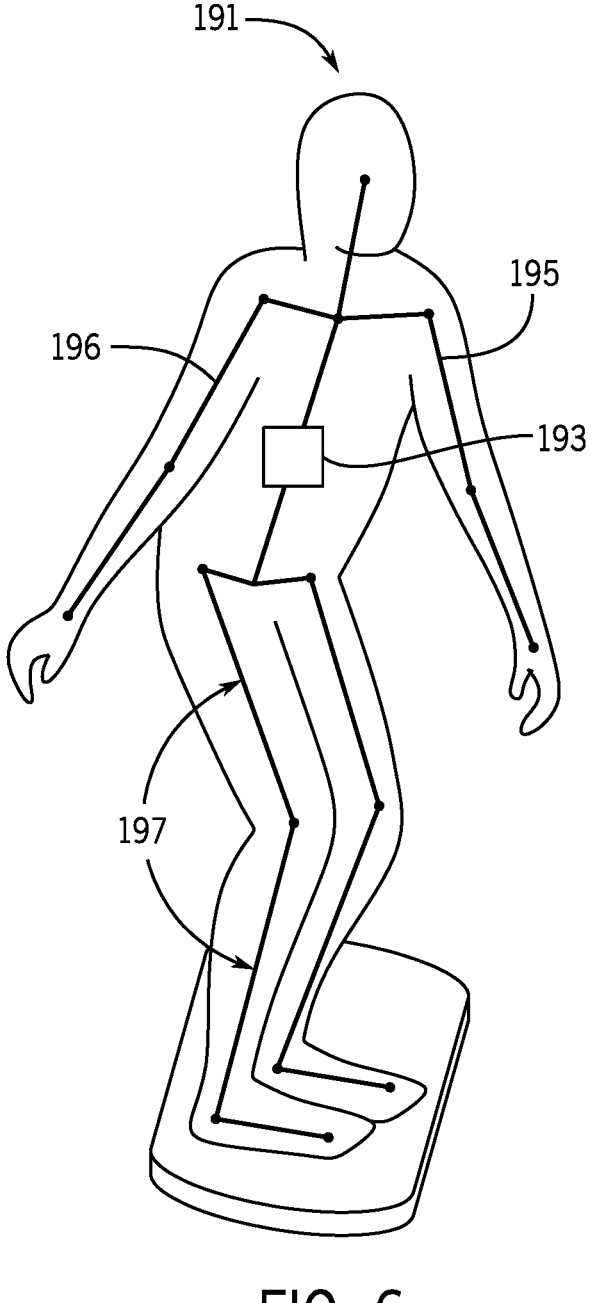
FIG. 6 exemplifies an ideal pose estimate and ideal pose information, in accordance with the present disclosure.

The pose feedback 200 may include insights into postural changes to bring the surfer pose into alignment with selected ideal pose information, such as to achieve an ideal pose or just to avoid falling when wake surfing. Referring now to FIG. 6, the ideal pose information includes various numerical descriptions of ideal surf poses or portions of an ideal pose, such as vectorized representations described above. Based on observable characteristics captured by the image system 150 such as height and width of shoulders, the wake surf monitoring system may assign variable weights of significance to 171, 172 body parts. These relative 'weights' may model approximates of human physiology. For example, the torso may have a higher 'weight' than an arm, signifying a greater mass. These 'weights' can then be used to make approximations for weight measurements, such as the ideal center of mass location 193 of the wake surfer 170. These approximations can enable the pose feedback to indicate situations, such as putting too much weight over the edge of the board or toes, that contributes to falling when wake surfing. Similarly, the control system may account for these mass approximations when making recommendations to postural adjustment. For example, a weightless arm might be raised to a different height and distance away from the torso to establish balance than a 'weighted' arm. This account for mass and resultant forces effectuated on the wake surfer 170 by mass allow the pose feedback 200 to deliver precise and accurate postural feedback.

The utilization of stereo cameras and/or other three-dimensional image devices (such as LIDAR) can provide complete and accurate pose feedback 200 that encompasses all potential degrees of freedom that may contribute to navigational challenges. Pose feedback 200 may also provide more insight into postural placement, such as where to shift a foot to prevent falling, in a three-dimensional analysis. This method of three-dimensional point mapping applies to other forms of sensor modalities such as LIDARs and point cloud calculations. In situations without other forms of three-dimensional mapping, this can also be mapped with two-dimensional visual imaging to formulate positional estimations for the surfer pose estimate 185.

Without three-dimensional capabilities, two-dimensional analysis of the wake surfer 170 may still relay depth information through size measurements and approximation. For example, a two-dimensional image of a wake-surfer from a front view might show one knee and foot as larger than the other. The control system 100 may use relative measurements to recognize that one foot is in front of the other. Relative distance between the feet or legs can also indicate a stance that may be too wide or narrow. These comparators, in combination with approximated 'weighted' values for different body parts, can provide insight when the approximated center of mass of the wake surfer 170 extends beyond the feet, beyond the board, or otherwise shifts to an imbalanced position. Similarly, positions indicative of imbalance can also be used to inform the wake surf monitoring system. For example, if a wake surfer stands on one leg and promptly falls off the board, the wake surf monitoring system will recognize the position as the cause of the fall.

Referring again to FIG. 5, when the wake surfer 170 falls, the method of displaying pose feedback 200 may be determined by the user. After falling, the pose feedback display 210 may run a loop of a predetermined amount of time, such as the last 10 seconds before falling. Other methods of displaying the pose feedback 200 may include real-time calculations, a stored replay (of the entire time before falling), or a focused segment of recorded surfer pose data (based on a predetermined setting, such as detecting excessive crouching or undesired rotation). In one embodiment, the pose feedback display may impose an overlay of the ideal pose estimate 191 on the pose feedback display so the wake surfer 170 may try to imitate the ideal pose estimate 191. This superimposition may overlay the pose feedback display 210 either in a post-production review of the wake surf run or in real-time as the wake surfer 170 is still actively surfing behind the marine vessel 10.

In one embodiment, the pose feedback may be determined by the wake surfer. Before beginning surfing or anytime during surfing, the wake surfer may select or adjust the skill level of the ideal pose information display. For example, the wake surfer can select "beginner" where the system uses beginner pose information or "advanced" where the system uses advanced pose information. Differences between beginner and advanced might be the body part positions, relative positions, different center of mass, or different expected location on the wave (or in the image), as non-limiting examples. If the user selects beginner mode, a larger pose difference is tolerated when generating the feedback than if the user selects advanced mode. Alternatively, the wake surfer may select a preferred pose parameter. Selected preferred pose parameters may adjust the pose feedback 200 provided to the wake surfer 170 or selected to practice a specific parameter or method of wake surfing. For example, the wake surfer 170 can select an ideal pose estimate 191 from several different ideal pose estimates, select a pose parameter such as surfer and board alignment, select a surfing "style", or similarly adjust the pose parameters that the wake surf monitoring system considers ideal.

To determine when the wake surfer 170 falls, the wake surf monitoring system may collect surfer pose data 180 from images 155 captured at a predetermined rate, such as 30 images 155 per second. In one embodiment, the control system 100 is further configured to identify a surfer pose estimate 185 in each of the predetermined number of images 155 per second to determine the surfer pose data 180. Deviations in accurately captured images of the wake surfer 170 at this predetermined rate may be utilized to detect a fall. After reaching a predetermined number of seconds and/or images 155 without a detected wake surfer 170 or threshold number of surfer pose estimates 185, the wake surf monitoring system may recognize the wake surfer 170 has fallen. In one embodiment, detection of a fall can trigger a fall alert, which notifies the operator of the marine vessel 10 when the wake surfer 170 has fallen. Other notifications that can be activated by the fall alert include notifying the marine vessel 10 (for autonomous navigation), telling the driver, or the control system of the marine vessel 10 to decelerate the marine vessel 10 further.

Figure 7:
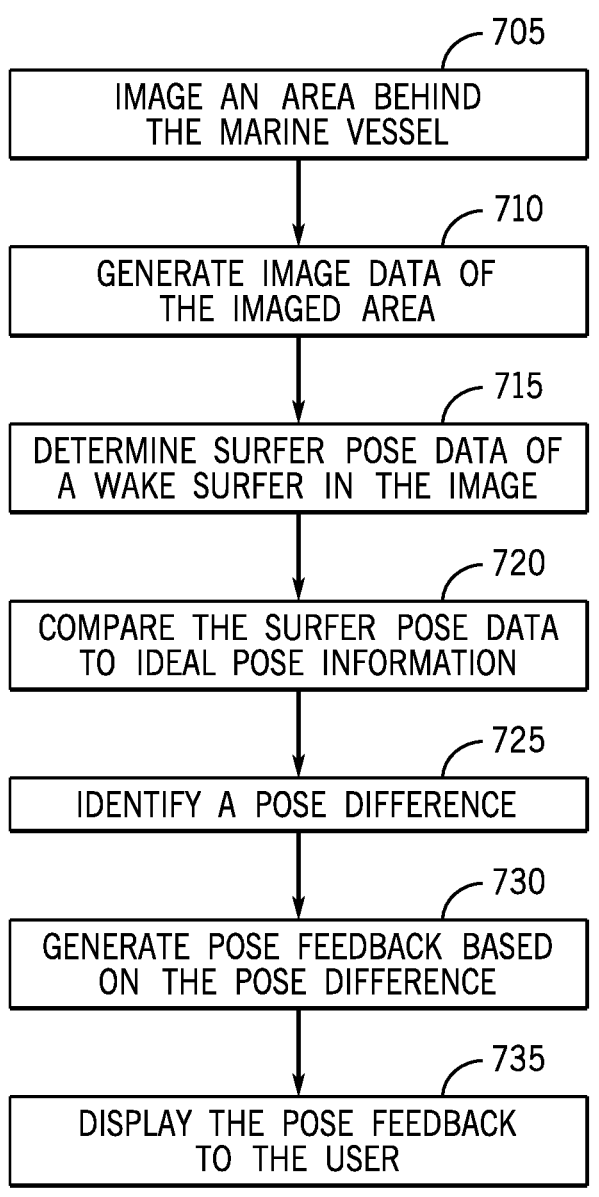

Referring now to FIG. 7, exemplary method steps for a wake surf monitoring system are illustrated. At 705, an area behind the marine vessel 10 is imaged. At 710, the image data of the imaged area is generated. At 715, the surfer pose data of the wake surfer in the image is determined. At 720, the surfer pose data is compared to the ideal pose information. At 725, a pose difference between the surfer pose estimate and the ideal pose information, such as an ideal pose estimate, is identified. At 730, pose feedback based on the pose difference is generated. At 735, the pose feedback is display to the user.

Figure 8:
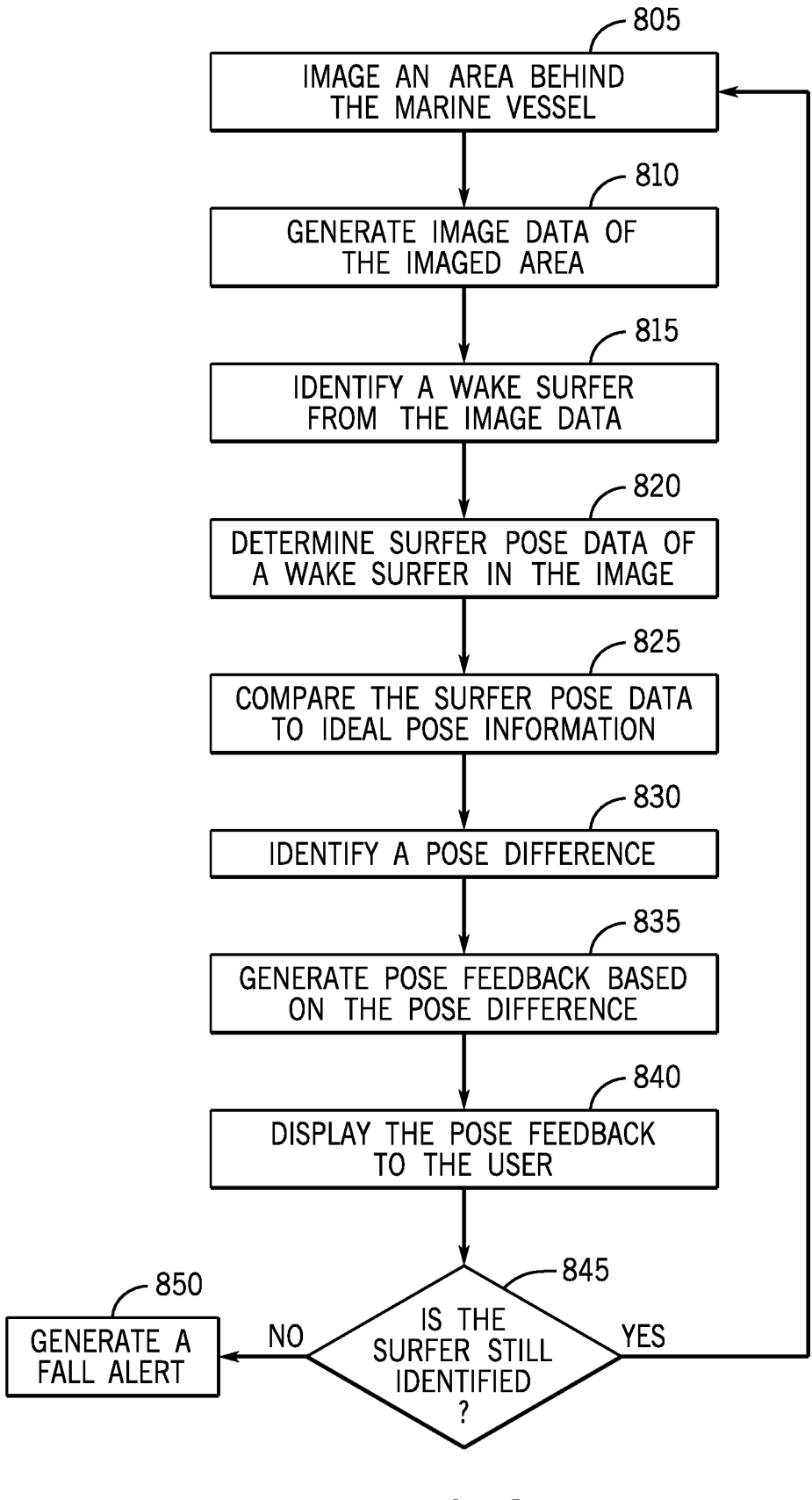

Referring now to FIG. 8, exemplary method steps for a wake surf monitoring system are illustrated. At 805, an area behind the marine vessel 10 is imaged. At 810, the image data of the imaged area is generated. The image data is sampled at a predetermined number of images per second, such as 30 images per second. At 815, the wake surfer from the image data is identified. At 820, the surfer pose data of the wake surfer in the image is determined. The control system is further configured to identify a surfer pose estimate in each of the predetermined number of images per second to determine the surfer pose data. At 825, the surfer pose data is compared to the ideal pose information. At 830, a pose difference between the surfer pose estimate and the ideal pose information is identified. At 835, pose feedback based on the pose difference is generated. At 840, the pose feedback is display to the user. At 845, the wake surf monitoring system determines whether the wake surfer is still identified in the image. If the wake surfer is identified, the steps repeat beginning at step 805. If the wake surfer is not identified, a fall alert is generated. The generation of a fall alert is determined if less than a threshold number of surfer pose estimates are identified in a predetermined period.

Referring now to FIG. 9, exemplary method steps for a wake surf monitoring system are illustrated. At 905, an ideal pose from a database of ideal pose information is selected. At 910, an area behind the marine vessel 10 is imaged. At 915, the image data of the imaged area is generated. At 920, the surfer pose data of the wake surfer in the image is determined. At 925, the surfer pose data is compared to the ideal pose information. At 930, a pose difference between the surfer pose estimate and the ideal pose information is identified. At 935, pose feedback based on the pose differ-
ence is generated. At 940, the pose feedback is display to the
user.

This written description uses examples to disclose the
invention, including the best mode, and also to enable any
person skilled in the art to make and use the invention.
Certain terms have been used for brevity, clarity, and under-
standing. No unnecessary limitations are to be inferred
therefrom beyond the requirement of the prior art because
such terms are used for descriptive purposes only and are
intended to be broadly construed. The patentable scope of
the invention is defined by the claims and may include other
examples that occur to those skilled in the art. Such other
examples are intended to be within the scope of the claims
if they have features or structural elements that do not differ
from the literal language of the claims, or if they include
equivalent features or structural elements with insubstantial
differences from the literal languages of the claims.

What is claimed is:

1. A wake surf monitoring system comprising:
an image system including at least one image sensor, the
image system configured to image an area behind a
marine vessel;
a control system configured to:
receive image data from the image system containing at
least one image of the area behind the marine vessel;
identify a wake surfer in the at least one image and
determine surfer pose data of the wake surfer;
compare the surfer pose data to ideal pose information
to identify a pose difference;
generate pose feedback based on the pose difference;
and
display the pose feedback.

2. The system of claim 1, further comprising a database of
ideal pose information stored in memory accessible by the
control system, and wherein the control system is configured
to select the ideal pose information for the comparison from
the database of ideal pose information.

3. The system of claim 2, wherein the control system is
further configured to select the ideal pose information based
on one or more of the surfer pose data, a location of the wake
surfer in the at least one image, a size of the wake surfer, or
a user input.

4. The system of claim 3, wherein the user input indicates
a skill level or a preferred pose parameter.

5. The system of claim 1, wherein the ideal pose infor-
mation includes an ideal relative body part location of at
least two body parts, an ideal body part angle of at least one
body part, an ideal relative angle of at least two body parts,
an ideal center of mass location of relative to at least one foot
of the wake surfer, and/or an ideal location of at least one
body part relative to a wake board; and
wherein the surfer pose data includes a relative body part
location of at least two body parts of the wake surfer,
a body part angle of at least one body part of the wake
surfer, a relative angle of at least two body parts of the
wake surfer, a center of mass location of the wake
surfer relative to at least one foot of the wake surfer,
and/or a location of at least one body part of the wake
surfer relative to a wake board.

6. The system of claim 1, wherein the pose feedback is
further based on a prior pose feedback generated for the
wake surfer.

7. The system of claim 1, wherein the control system is
further configured to identify the pose difference based on a
user input, wherein the user input indicates a skill level or a
preferred pose parameter.

8. The system of claim 1, wherein the image system
includes a plurality of cameras arranged as a stereo vision
system, and wherein the image data includes distance infor-
mation regarding the wake surfer.

9. The system of claim 1, wherein the control system is
further configured to:
determine a rider distance with respect to the marine
vessel based on distance information regarding the
wake surfer;
at least one of select the ideal pose information based
on the rider distance or generate the pose feedback
further based on the rider distance.

10. The system of claim 9, wherein the control system is
further configured to compare the rider distance to an
optimal distance range and to generate the pose feedback
further based on the comparison.

11. The system of claim 1, wherein the image data
includes a predetermined number of images per second and
wherein the control system is further configured to identify
a surfer pose estimate in each of the predetermined number
of images per second to determine the surfer pose data.

12. The system of claim 11, wherein the control system is
further configured to generate a fall alert if less than a
threshold number of surfer pose estimates are identified in a
predetermined period.

13. A method of monitoring wake surfing, the method
comprising:
imaging with an image system an area behind a marine
vessel to generate image data;
processing the image data with a controller to determine
surfer pose data of a wake surfer in the image;
comparing the surfer pose data to ideal pose information
to identify a pose difference;
generating pose feedback based on the pose difference;
and
displaying the pose feedback.

14. The method of claim 13, further comprising selecting
the ideal pose information for the comparison from a data-
base of ideal pose information based on the surfer pose data,
a location of the wake surfer in at least one image, a size of
the wake surfer, and/or a user input.

15. The method of claim 14, further comprising:
determining a rider distance with respect to the marine
vessel based on distance information regarding the
wake surfer; and
selecting the ideal pose information based on the rider
distance.

16. The method of claim 13, further comprising generat-
ing a database of ideal pose information indexed based on a
surfer ID, surfer pose data, location of the wake surfer in at
least one image, size of the wake surfer, a skill level, and/or
a preferred pose parameter, and storing the database of ideal
pose information in memory accessible by the controller.

17. The method of claim 13, further comprising receiving
user input indicating a skill level or a preferred pose param-
eter and at least one of select ideal pose information or
identify the pose difference based on the user input.

18. The method of claim 13, wherein the pose difference
is a difference in 2D space between the surfer pose data and
the ideal pose information.

19. The method of claim 13, wherein the ideal pose
information includes an ideal relative body part location of
at least two body parts, an ideal body part angle of at least
one body part, an ideal relative angle of at least two body
parts, and/or an ideal center of mass location of relative to
at least one foot of the wake surfer; and wherein the surfer pose data includes a relative body part location of at least two body parts of the wake surfer, a body part angle of at least one body part of the wake surfer, a relative angle of at least two body parts of the wake surfer, and/or a center of mass location of the wake surfer relative to at least one foot of the wake surfer.

20. The method of claim 13, wherein the ideal pose information includes an ideal location of at least one body part relative to a wave feature and/or an ideal location of at least one body part relative to a wake board; and wherein the surfer pose data includes a location of at least one body part of the wake surfer relative to a wave feature and/or a location of at least one body part of the wake surfer relative to a wake board.

21. The method of claim 13, further comprising generating the pose feedback based on prior pose feedback generated for the wake surfer and stored in memory.

22. The method of claim 13, further comprising determining a rider distance between the wake surfer an at least a portion of the marine vessel based on the image data, and comparing the rider distance to an optimal distance range and to generating the pose feedback further based on the comparison.

23. The method of claim 13, wherein the image data includes a predetermined number of images per second, the method further comprising:

determining a surfer pose estimate for each of the predetermined number of images per second for which a surfer is identified to determine the surfer pose data; and generating a fall alert if less than a threshold number of surfer pose estimates are identified in a predetermined period.

* * * * *